(No Model.)
O. T. DE SIEGHARDT.
APPARATUS FOR GENERATING AND STORING ACETYLENE GAS.
No. 558,746. Patented Apr. 21, 1896.
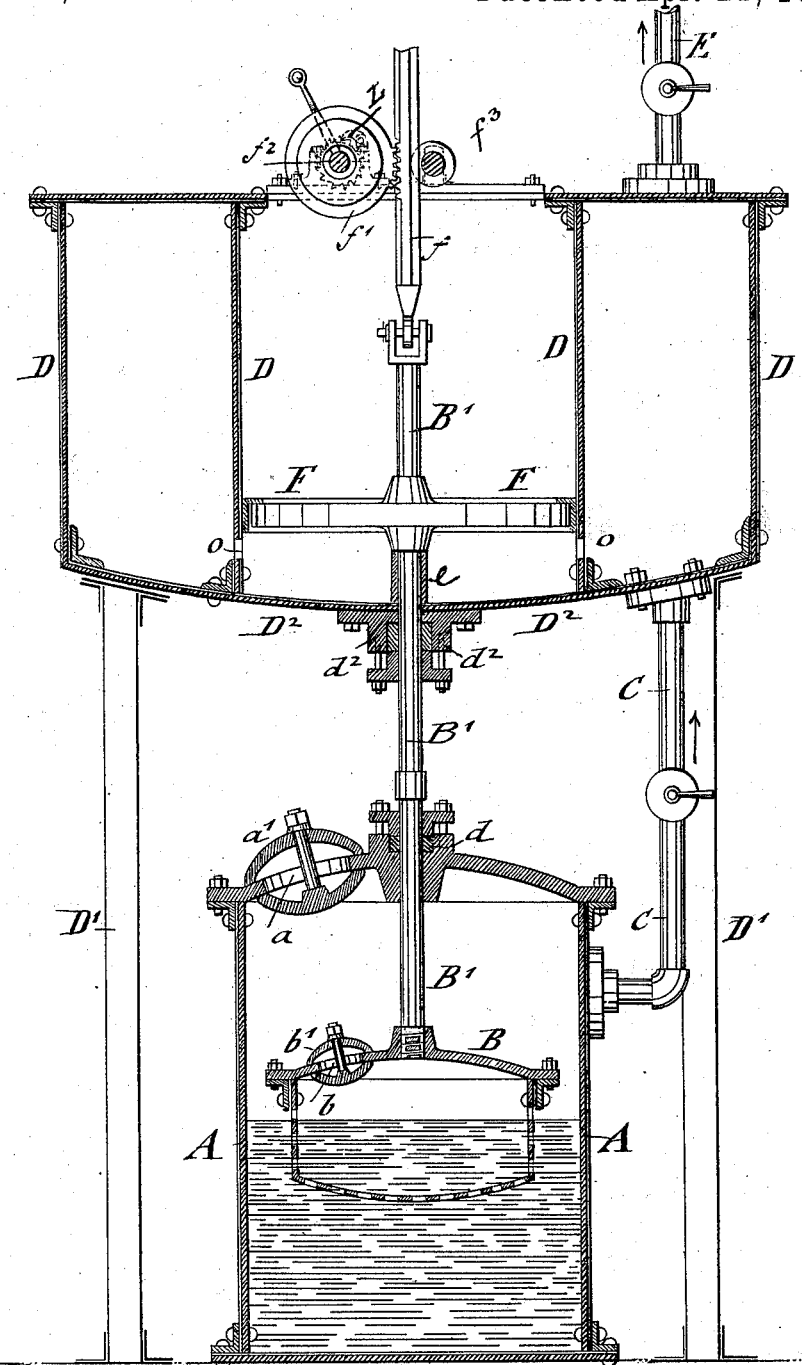

UNITED STATES PATENT OFFICE.

OTTO TAUSCHER DE SIEGHARDT, OF NEW YORK, N. Y.

APPARATUS FOR GENERATING AND STORING ACETYLENE GAS.

SPECIFICATION forming part of Letters Patent No. 558,746, dated April 21, 1896.

Application filed January 3, 1896. Serial No. 574,193. (No model.)

*To all whom it may concern:*

Be it known that I, OTTO TAUSCHER DE SIEGHARDT, a citizen of the United States, residing at New York, in the county and State of New York, have invented certain new and useful Improvements in Apparatus for Generating and Storing Acetylene Gas, of which the following is a specification.

This invention has reference to an improved apparatus for producing and storing acetylene gas under pressure, so that it is ready for use, said apparatus being connected with the service-pipe of a building and so arranged as to automatically generate and supply the gas as required; and the invention consists of an apparatus for generating acetylene gas, which comprises a tank for the water, a receiver for the calcium or other carbide, provided with perforated walls and adapted to be automatically raised or lowered into the water in the tank, an annular storage-receptacle for receiving the acetylene gas generated in the receiver, a valved pipe connecting the tank with the storage-receptacle, and means for regulating the generation of the gas in the tank, as required. The regulating mechanism comprises a piston at the inner portion of the receptacle, a piston-rod attached to the carbide-receiver and guided in stuffing-boxes on top of the tank and on the bottom of the storage-receptacle, the inner wall of said storage-receptacle being connected by openings with the space inclosed by the piston, the inner walls and the bottom of the storage-receptacle, so that the piston is automatically raised by the pressure of the gas in the storage-receptacle and the carbide-receiver lifted out of the water in the tank, so that the generation of the acetylene gas is interrupted, while the carbide-receiver is lowered into the water when, by the consumption of the gas, the pressure of the same in the storage-receptacle is diminished, as will be fully described hereinafter, and finally pointed out in the claims.

Similar letters of reference indicate corresponding parts.

The accompanying drawing represents a vertical transverse section of my improved apparatus for generating and supplying acetylene gas.

It is well known that acetylene gas is generated by the decomposition of a calcium or other carbide when bringing the same in contact with water in a suitable vessel. The gas thus generated, instead of being supplied directly to the burners, where the same is consumed, is conducted to an intermediate storage-receptacle, which forms a portion of my improved apparatus and in which the gas is accumulated under pressure and conducted to the service-pipes and burners for use.

In my improved apparatus for generating acetylene gas the water by which the calcium carbide is decomposed is placed into a cylindrical or other tank A, which is made of sufficient strength, so as to resist the pressure of the gas generated in the same, and which is provided in its top part with a hand-hole $a$ and a hand-hole cover $a'$, through which the water is supplied to the interior of the tank A. In the tank A is arranged a smaller receptacle or receiver B, which is likewise made of suitable material capable of resisting a certain pressure and the side walls and bottom of which are perforated, while the top is provided with a hand-hole $b$ and hand-hole cover $b'$, through which the carbide, preferably calcium carbide, is supplied to the interior of the receiver B. The main tank A is connected by a valved pipe C with the bottom of an annular storage-receptacle D, which is supported by upright standards D' and the bottom $D^2$ of which is extended inwardly, so as to close the lower part of the open cylindrical space surrounded by the storage-receptacle D.

From the upper end of the storage-receptacle D extends a valved pipe E, which is connected with the service-pipe by which the acetylene gas is supplied to the burners.

To the top of the carbide-receiver B is attached a piston-rod B', which extends through stuffing-boxes $d$ $d^2$, located, respectively, at the top of the tank A at the center of the bottom $D^2$ of the storage-receptacle D, said piston-rod passing through a stationary center sleeve $e$ above the stuffing-box $d^2$ into the cylindrical space inclosed by the storage-receptacle D. To the piston-rod B' is applied a piston F, which is fitted tightly to the interior wall of the storage-receptacle D, and which forms, with the bottom D² of the storage-receptacle D and the interior wall of the latter, a receptacle to which the acetylene gas is supplied by means of openings $o$ in the lower part of the interior wall of the storage-receptacle D. To the upper end of the piston-rod is pivoted a rack-bar $f$, that meshes with a pinion $f'$, applied to a crank-shaft $f^2$, by which the piston, and thereby the carbide-receiver, can be readily lifted, so as to remove the carbide-receiver out of the water in the tank A. The rack-bar $f$ is guided on a grooved roller $f^3$, which holds it in mesh with the pinion $f'$. When the receiver is thus raised, the crank-shaft is retained by a pawl-and-ratchet mechanism or other locking device L until the carbide-receiver is recharged with the carbide and lowered again into the water for the generation of the gas.

When the carbide-receiver is lowered into the water in the tank A, the decomposition of the carbide takes place in the well-known manner by the formation of calcium hydrate and acetylene gas. The acetylene gas is conducted through the pipe C into the annular storage-receptacle D and into the space below the piston until the pressure of the gas raises the piston and lifts the carbide-receiver out of the water so that the generation of gas is interrupted. When the supply-cock of the service-pipe E is opened, the gas is supplied to the burners and consumed. The pressure of the gas in the storage-receptacle D is thereby reduced and the piston permitted to fall, so that the carbide-receiver is again submerged in the water in the tank A, and thereby the generation of acetylene gas resumed. By the increasing pressure in the storage-receptacle the carbide-receiver is again raised partly or entirely out of the water in the tank A, and so on alternately according to the consumption of the gas by the burners, the apparatus forming thus a storage-receptacle for the acetylene gas and an automatic regulator for the pressure of the same.

When it is desired to interrupt the working of the apparatus, the carbide-receiver is raised by the crank-shaft and locking device L entirely out of the water in the tank, so that the generation of the gas is interrupted. When the carbide-receiver is raised to the top of the tank A, the hand-hole covers $a'$ and $b'$ can be removed and the receiver recharged with calcium carbide.

The water with the hydrated calcium oxid is removed from time to time from the tank, and a new supply of water charged into the same through the hand-hole $a$ in any evident manner.

My improved apparatus for generating acetylene gas has the advantage that it can be readily placed in the basement of a building and connected at will with the service-pipe of the same without interfering with the supply of the ordinary illuminating-gas, that it can be readily charged with water and calcium carbide as needed, that the acetylene gas is supplied at uniform pressure to the service-pipe and burners, and thereby the use of this improved illuminant made available without the least danger for domestic and business purposes.

Having thus described my invention, what I claim as new, and desire to secure by Letters Patent, is—

1. An apparatus for generating and storing acetylene gas, which consists of a tank for containing water, a carbide-receiver having perforated walls and located in said tank, a storage-receptacle for the gas, above said tank, a valved pipe connecting said tank with the storage-receptacle, and a regulator located in and operated by the pressure of gas led into the storage-receptacle for automatically raising or lowering the carbide-receiver so as to interrupt or resume the generation of gas, substantially as set forth.

2. An apparatus for generating and storing acetylene gas, consisting of a tank for containing water, a carbide-receiver having perforated walls and located in said tank, a storage-receptacle for the gas, above said tank, a valved pipe connecting said tank with the storage-receptacle, a regulator located in and operated by the pressure of gas led into the storage-receptacle for automatically raising or lowering the carbide-receiver out of or into the water in the tank, and means for locking the receiver in raised position, substantially as set forth.

3. An apparatus for generating and storing acetylene gas, which consists of a tank containing water, a carbide-receiver having perforated walls located in said tank, an annular storage-receptacle for the gas above said tank, a valved pipe connecting the tank with said storage-receptacle, a piston-rod applied to the top of the carbide-receiver and guided in the top of the water-tank and the bottom web of the storage-receptacle, a piston on the piston-rod of the carbide-receiver, and openings in the interior wall of the storage-receptacle below the piston, so that the generation of acetylene gas is interrupted or started according to the consumption of the same, substantially as set forth.

4. An apparatus for generating and storing acetylene gas, which comprises a water-tank, a carbide-receiver provided with perforated walls located in said tank, an annular storage-receptacle supported above the water-tank, a valved pipe connecting the upper part of the tank with the bottom of the storage-receptacle, a valved pipe connecting the storage-receptacle with the service-pipe of the building, a piston-rod attached to the top of the carbide-receiver and guided in stuffing-boxes on the top of the water-tank and bottom of the storage-receptacle, a piston attached to said piston-rod, and means for raising the receiver above the level of the water in the tank and locking it in this position so as to interrupt the generation of the gas or recharging the same, substantially as set forth.

In testimony that I claim the foregoing as my invention I have signed my name in presence of two subscribing witnesses.

OTTO TAUSCHER DE SIEGHARDT.

Witnesses:
PAUL GOEPEL,
GEO. W. JAEKEL.